March 6, 1928.

Re. 16,893

H. E. HOOVER

SUCTION CLEANER

Original Filed Feb. 17, 1919

Inventor
Howard Earl Hoover
By H. S. Dwarz
Attorney.

Reissued Mar. 6, 1928. Re. 16,893

UNITED STATES PATENT OFFICE.

HOWARD EARL HOOVER, OF GLENCOE, ILLINOIS, ASSIGNOR, BY MESNE ASSIGNMENTS, TO THE HOOVER COMPANY, OF NORTH CANTON, OHIO, A CORPORATION OF OHIO.

SUCTION CLEANER.

Original No. 1,364,761, dated January 4, 1921, Serial No. 277,472, filed February 17, 1919. Renewed November 4, 1920, Serial No. 421,791. Application for reissue filed December 14, 1925. Serial No. 75,458.

My invention relates to improvements in suction sweepers particularly of a motor-driven brush type and has for one object to provide a new and improved form of housing and moving parts such that the height of the machine will be a minimum. Another object is to provide an apparatus which will be light, compact, durable and easily handled. Other objects of my invention will appear from time to time in this specification.

My invention comprises, therefore, an apparatus in which the combined fan and motor housing is so tilted that the overall height is less than it would be if the motor and fan were vertical or if the motor and fan were horizontal because in vertical position the great length of the motor may make the height of the apparatus excessive and in horizontal position the great diameter of the fan housing may make the height of the apparatus excessive, and by tilting them the height is obviously less than it would be in either of the two above mentioned positions.

My invention is illustrated more or less diagrammatically in the accompanying drawings wherein—

Like parts are indicated by like characters in the drawings.

Figure 1:
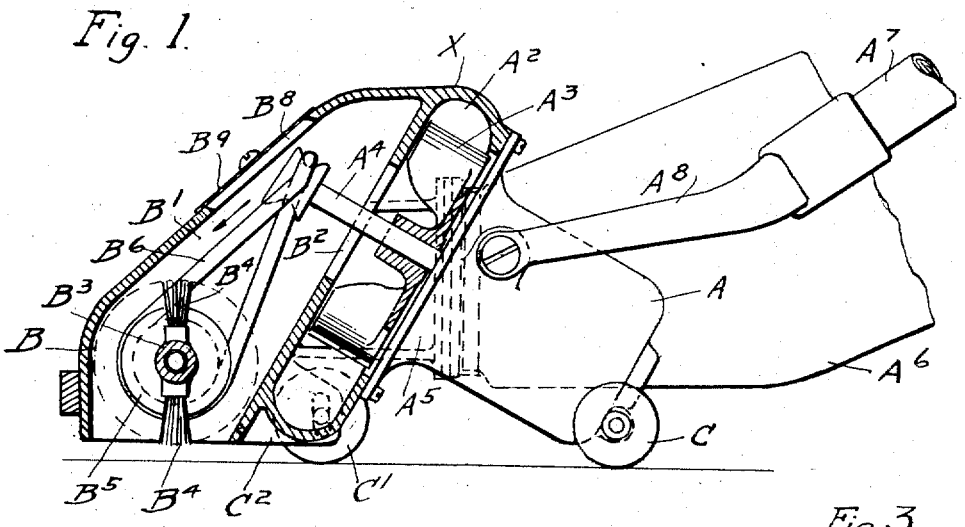
Figure 1 is a side elevation in part section.
Figure 3:
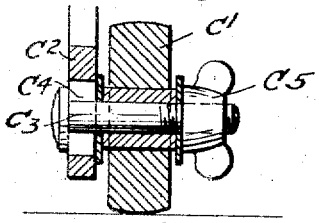
Fig. 3 is a detail of the roller adjustment.
Figure 2:
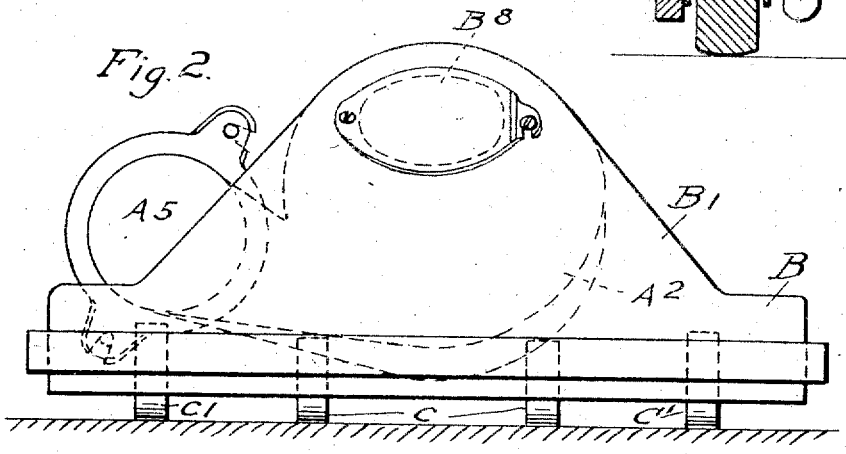
Fig. 2 is a front elevation.

A is a motor housing containing the usual form of motor not shown. $A^2$ is a fan housing attached to the motor housing and containing a fan $A^3$ carried by the motor shaft $A^4$. $A^5$ is an air discharge passage leading from the fan chamber and in register with the open mouth of a dust and air separating bag $A^6$. $A^7$ is a handle provided with a handle bail $A^8$ pivoted on the motor housing A. The handle bail is bent forwardly from its point of junction with the handle, and instead of being more sharply inclined to the horizontal than is the handle, it approaches parallelism with a horizontal plane; the object of this being, of course, to insure that the handle bail will be almost entirely below the highest point of the housing.

B is an open mouthed suction nozzle connected by means of a tapering passage $B^1$ with the aperture $B^2$ in the front wall of the fan chamber. It happens in this case that the fan chamber passageway and nozzle are all in one integral casting, though they might be separate. $B^3$ is a brush mounted for rotation in the nozzle so arranged that the bristles $B^4$ extend down slightly below the plane of the open mouth. $B^5$ is a pulley on the brush, driven by a belt $B^6$ which in turn is driven by a pulley $B^7$ on the motor shaft $A^4$ so that when the motor rotates the fan to suck air in through the open mouth and discharge it into the bag it simultaneously drives the brush. The front wall of the passage $B^1$ is apertured as at $B^8$ and this aperture is closed by the removable housing $B^9$, the parts being so arranged that when it is desired to draw air into the fan chamber through a hose pipe an adapter of a suitable type not here illustrated may be passed in through the opening $B^8$, to close the opening $B^2$ and thereby disconnect the suction nozzle from the fan chamber.

C C are rear supporting rollers, one arranged on either side of the downward and rearward end of the motor housing, and these rollers are spaced one on either side of the axis of the machine to provide lateral stability. $C^1$ $C^1$ are forward supporting rollers mounted for adjustment on lugs $C^2$ which project downwardly from the fan housing and rearwardly from the nozzle. The studs $C^3$, upon which the rollers are mounted, are slidable in slots $C^4$ in the lugs $C^2$. When the thumb screw $C^5$ is tightened up, movement in the slot ceases and so the roller may be locked in adjustable position to control the height at which the nozzle stands above the floor.

It will be evident that while I have shown an operative device, still many changes might be made both in size, shape and arrangement of parts without departing materially from the spirit of my invention, and I wish, therefore, that my drawings be regarded as in a sense at least very diagrammatic.

The use and operation of my invention are as follows:—

When current is supplied to the motor to drive it in the usual manner, the fan rotates and draws air in through the open suction nozzle to carry off dust and dirt from the floor covering which is being cleaned The brush, being driven by the rotation of the motor shaft, brushes and beats the covering so as to assist in loosening the dirt.

The peculiar inclination of the axis of rotation of the motor, and therefore, the inclination of the motor and fan housing, does not in any way affect the operation of the device but, as previously indicated, the total height of the device is less than it would be if the axis of rotation were horizontal or vertical because the height from the plane of the suction nozzle to the point which I have indicated by X in Fig. 1 is manifestly less than the diameter of the fan casing or length of the motor shaft.

The motor is, of course, housed but the housing is a part of the motor and it is of the essence of the scheme that the housing of the motor is so positioned as to co-operate with the other parts in producing the minimum height of one part of the mechanism for producing this result is the lower part of the motor, that is to say, the housing in the plane of the nozzle.

If the motor, using that term to indicate the motor proper and also its housing or casing, be shortened the total height of the suction cleaner can be reduced by tilting the fan chamber more sharply.

I claim:—

1. A suction cleaner casing having a rotatably mounted brush in combination with a fan and motor and means for driving the fan and brush from the motor, the common axes of fan and motor downwardly and rearwardly inclined.

2. A suction cleaner having a suction chamber a fan chamber and a motor arranged in the order indicated from front to rear, the common axes of fan and motor downwardly and rearwardly inclined, a shaft for motor and fan projecting in the suction chamber, a brush in the suction chamber and means whereby the brush is driven from the shaft.

3 A suction cleaner having a suction chamber, a fan chamber and a motor arranged in the order indicated from front to rear, the common axes of fan and motor downwardly and rearwardly inclined, a shaft for motor and fan projecting into the the suction chamber, a brush in the suction chamber and a driving belt in the suction chamber from shaft to brush whereby the latter is driven from the former.

4. A suction cleaner casing having a rotatably mounted brush in combination with a fan and motor arranged in the order indicated from front to rear and means for driving the fan and brush from the motor, the common axes of fan and motor downwardly and rearwardly inclined.

5. A suction cleaner having a suction chamber, a fan chamber and a motor arranged in the order indicated from front to rear, the common axes of fan and motor downwardly and rearwardly inclined, a shaft for motor and fan projecting in the suction chamber, a brush in the suction chamber and means whereby the brush is driven from the shaft, the lowest part of the motor being approximately in the same plane as the lowest part of the suction chamber.

6. A suction cleaner having a suction chamber, a fan chamber and a motor arranged in the order indicated from front to rear, the common axes of fan and motor downwardly and rearwardly inclined, a shaft for motor and fan projecting in the suction chamber, a brush in the suction chamber and a driving belt in the suction chamber from shaft to brush whereby the latter is driven from the former the lowest part of the motor being approximately in the same plane as the lowest part of the suction chamber.

7. A suction cleaner casing having a rotatably mounted brush in combination with a fan and motor and means for driving the fan and brush from the motor, the common axes of fan and motor downwardly and rearwardly inclined, the lowest part of the motor being approximately in the same plane as the lowest part of the casing.

Signed at Chicago, in the county of Cook, and State of Illinois, this 9th day of December, A D., 1925.

HOWARD EARL HOOVER.